US009619827B1

United States Patent
Joneja

(10) Patent No.: US 9,619,827 B1
(45) Date of Patent: Apr. 11, 2017

(54) FLEXIBLE RESOURCE COMMITMENTS FOR COMPUTING RESOURCES

(71) Applicant: Google Inc., Mountain View, CA (US)

(72) Inventor: Navneet Joneja, Issaquah, WA (US)

(73) Assignee: Google Inc., Mountain View, CA (US)

( * ) Notice: Subject to any disclaimer, the term of this patent is extended or adjusted under 35 U.S.C. 154(b) by 480 days.

(21) Appl. No.: 14/206,021

(22) Filed: Mar. 12, 2014

(51) Int. Cl.
*G06K 7/00* (2006.01)
*G06Q 30/02* (2012.01)
*G06F 9/50* (2006.01)

(52) U.S. Cl.
CPC ....... *G06Q 30/0284* (2013.01); *G06F 9/5011* (2013.01)

(58) Field of Classification Search
USPC ............... 235/375, 383; 705/5, 7, 35–45; 711/147–179; 712/220–248; 700/1–89; 718/100–108
See application file for complete search history.

(56) References Cited

U.S. PATENT DOCUMENTS

| | | | |
|---|---|---|---|
| 2012/0120798 A1 | 5/2012 | Jacquet | |
| 2013/0066477 A1* | 3/2013 | Jiang | G01D 4/002 700/291 |
| 2013/0091282 A1 | 4/2013 | Tontiruttananon | |

FOREIGN PATENT DOCUMENTS

| | | |
|---|---|---|
| WO | WO2012021328 A3 | 4/2012 |
| WO | WO2013133999 A1 | 9/2013 |
| WO | WO2012173604 A3 | 12/2013 |

OTHER PUBLICATIONS

"Amazon EC2 Reserved Instances," [online][Retrieved on Mar. 12, 2014]; Retrieved from the Internet URL: http://aws.amazon.com/ec2/purchasing-options/reserved-instances/; 20 pages.
"6-Month and 12-Month Plans," [online][Retrieved on Mar. 12, 2014]; Retrieved from the Internet URL: https://www.windowsazure.com/en-us/offers/commitment-plans/; 4 pages.

* cited by examiner

*Primary Examiner* — Matthew Mikels
(74) *Attorney, Agent, or Firm* — Fish & Richardson P.C.

(57) ABSTRACT

Methods, systems, and apparatus, including computer programs encoded on a computer storage medium, for providing access to the use of computing resources. In one aspect, a method includes receiving, from a resource user, request data that specifies: a resource commitment rate for a particular computing resource and a burst tier related to the resource commitment rate. The resource commitment rate can specify a first number of units of the particular computing resource that the resource user has committed to leasing for a particular time period. The burst tier can specify an additional number of units of the particular computing resource that the resource user can use simultaneously with the first number of units of the particular computing resource at a discounted rate during the particular time period. The discounted rate for using the additional units is determined based on the first number of units and the additional number of units.

20 Claims, 4 Drawing Sheets

FLEXIBLE RESOURCE COMMITMENTS FOR COMPUTING RESOURCES

BACKGROUND

Cloud computing and other distributed computing systems allow resource providers to offer computing resources for use by others over a network. For example, a resource provider may host a web-based application for a business, and enable use of the web-based application over the Internet. Furthermore, some companies have organizational distributed computing systems in which employees or departments may be able to request and use computing resources of the distributed computing system.

Cloud computing resources are often sold on a pay-as-you-go model, but acquired by the resource provider as a long-term, depreciating asset. This model subjects the resource provider to risks associated with capacity planning. In some instances, resource providers mitigate the capacity planning risks by obtaining long term, inflexible resource commitments from resource users.

SUMMARY

In general, one innovative aspect of the subject matter described in this specification can be embodied in methods that include the actions of receiving, by a data processing apparatus and from a resource user, request data that specifies: a resource commitment rate for a particular computing resource, the resource commitment rate specifying a first number of units of the particular computing resource that the resource user has committed to leasing for a particular time period; and a burst tier related to the resource commitment rate, the burst tier specifying an additional number of units of the particular computing resource that the resource user can use simultaneously with the first number of units of the particular computing resource at a discounted rate during the particular time period; determining, by the data processing apparatus, the discounted rate for using the additional units based on the first number of units and the additional number of units; providing, to the resource user and during the particular time period, access to use of a requested number of units of the particular resource, the requested number of units varying over time and exceeding the first number of units at least once during the particular time period; and determining a cost for using the requested number of units based on the discounted rate and a lease rate for leasing the first number of units. Other embodiments of this aspect include corresponding systems, apparatus, and computer programs, configured to perform the actions of the methods, encoded on computer storage devices.

These and other embodiments can each optionally include one or more of the following features. In some aspects, receiving the request data includes receiving a selection of the burst tier from a multitude of burst tiers. Each burst tier can specify a percentage increase above the resource commitment rate.

In some implementations, the discounted rate is directly proportional to the additional number of units. In some aspects, the burst tier further specifies a maximum amount of time during the particular time period that the resource user can use the additional number of units of the particular computing resource during the particular time period for the discounted rate. The discounted rate can be further based on the maximum amount of time.

In some aspects, the lease rate specifies a first cost per unit of the particular resource used per unit of time. In some aspects, the discounted rate specifies a second cost per unit of the particular resource user per unit of time. Determining the cost can include determining a first cost based on the first cost per unit rate and a first amount of time during the particular time period in which the resource user used no more than the first number of units of the particular computing resource; determining a second cost based on the second cost per unit rate a second amount of time during the particular time period in which the resource user used more than the first number of units of the particular computing resource but less than a sum of the first number of units and the additional number of units of the particular computing resource; and determining the cost based on a sum of the first cost and the second cost.

In some implementations, determining the cost can include determining that the resource user used, during one or more periods of time, a total number of units of the computing resource that exceeds a sum of the first number of units and the additional number of units; and determining, for each of the one or more periods of time, a third cost based on an increased rate and the total number of units used during the period of time, the third rate being greater than the lease rate and the discounted rate, wherein the cost is further based on a sum of the third costs.

In some aspects, the burst tier further specifies a maximum amount of time during the particular time period that the resource user can use the additional number of units of the particular computing resource during the particular time period for the discounted rate. Aspects can include determining that the second amount of time exceeded the maximum amount of time; identifying an excess time period after the maximum amount of time expired; and determining a third cost based on a length of the excess time period, a number of excess units of the particular computing resource used during the excess time period, and an increased cost for the number of excess units of the computing resource, the excess units being a number of units of the particular computing resource used in excess of the first number of units.

Particular embodiments of the subject matter described in this specification can be implemented so as to realize one or more of the following advantages. Resource providers can more accurately project resource needs and plan future capacity by using flexible resource commitments with resource users. Resource users can mitigate risks associated with under and over committing to computing resources by establishing a flexible resource commitment that allows the resource user to exceed a committed resource usage rate at a discounted price.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can facilitate flexible resource commitments between resource providers (e.g., cloud providers) and resource users (e.g., cloud customers). A flexible resource commitment is a combination of a commitment to use a certain number of units of a computer resource and a "burst tier." The burst tier specifies a maximum number of units that a resource user may make use of at a discounted rate. For example, the burst tier may specify an additional number of units that the resource user may make use of at a given time to receive the discounted rate for those additional units. The rate for resource usage that exceeds the burst tier may be higher than the discounted rate.

As an example, a resource user may typically use about five servers to execute an application during normal operation. In this example, the resource user may specify a commitment usage rate of five servers. The resource commitment rate may set a minimum number of units the resource user is committing to use over the course of a particular time period. The application may experience spikes where two or three additional servers may be needed to execute the application. In this example, the resource user may select a burst tier that allows the resource user to use up to three additional servers at a discounted price. Without the burst tier's additional units, the resource user may be charged a higher rate for use of the additional two or three servers. Thus, selection of a burst tier provides an economic incentive for a resource user to better forecast usage, which, in turn, allows for resource providers to better forecast future infrastructure needs.

Figure 1:
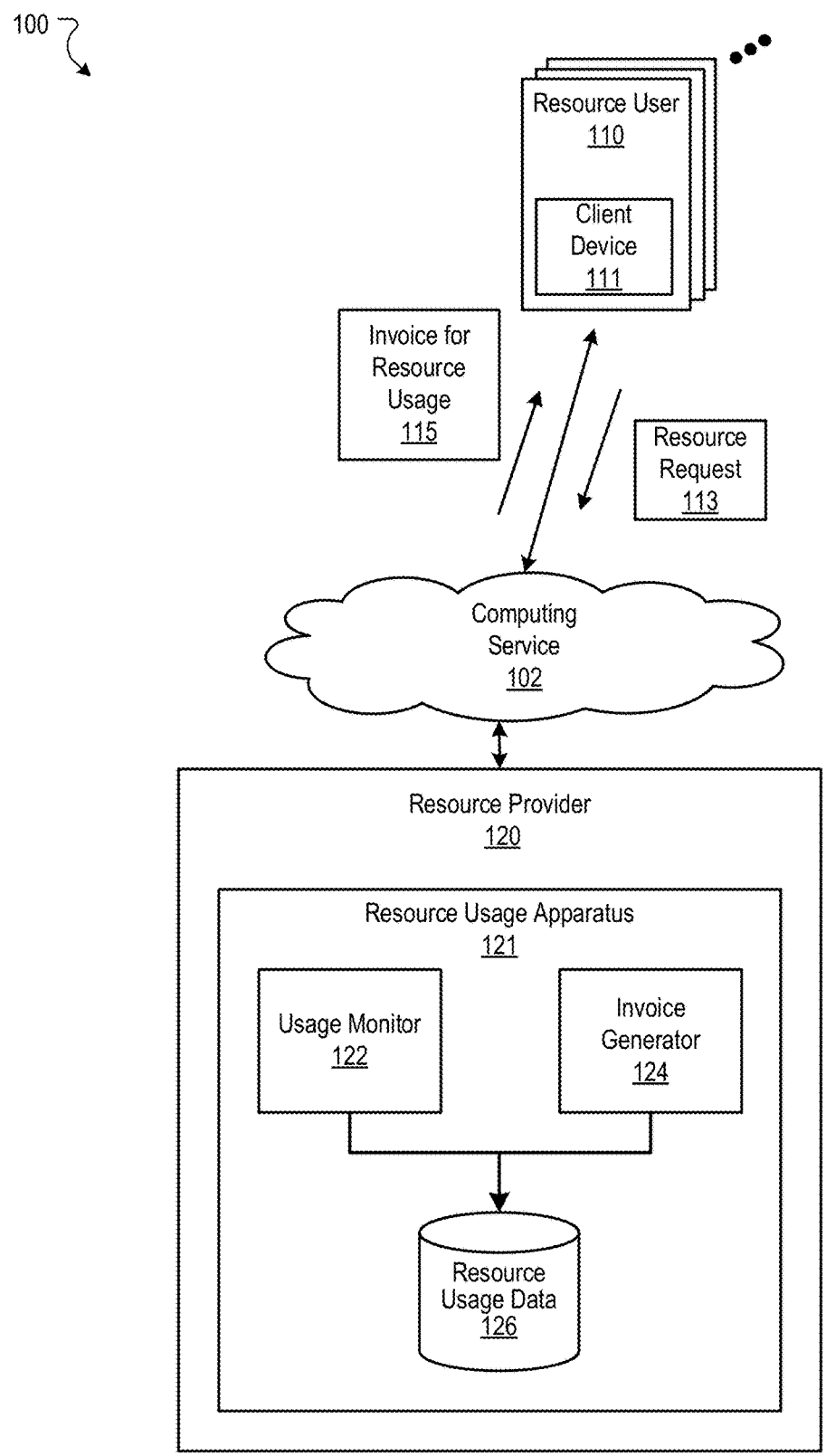
FIG. 1 is a block diagram of an example environment in which a resource provider provides access to computing resources.

FIG. 1 is a block diagram of an example environment 100 in which a resource provider 104 provides access to computing resources. The resource provider 120 may provide access to computing resources to resource users 110 by way of a computing service 102. The computing service 102 connects the resource provider 120 (and its computing resources) with client devices 111 of resource users 110. For example, the computing service 102 may include a network, e.g., a local area network (LAN), wide area network (WAN), the Internet, or a combination thereof, that connects the resource provider 120 and its computing resources with the client devices 111.

The resource provider 120 can provide the use of computing resources, such as servers, processors, data storage, virtual machines, and software applications by way of the computing service 102. In some implementations, the resource provider 120 is an Information Technology ("IT") group (e.g., within a company or external IT provider) that makes computing resources available to individuals or groups within an organization by way of an Intranet, WAN, or other type of network. The resource provider 120 may also be cloud provider or a third party broker that allocates computing resources from one or multiple cloud computing providers. For example, the resource user 110 may be a cloud customer that requests and uses cloud computing resources made available by one or more cloud providers over a cloud computing service that includes the network 102.

The computing resources provided by way of the computing service 102 can include raw computing resources, machine-level resources, racks of computing resources, and other types of computing resources that are accessible by way of a computing service 102. For example, the resources may include servers, processor cores, memory, data storage, network devices, and/or software applications. The resources can be provided in discrete units or in groups, e.g., a group of processors and memory.

A cloud customer, e.g., individuals and/or organizations that use cloud computing resources, can request computing resources by submitting resource requests 113 to the resource provider 104 using a cloud client 111 (e.g., a computer). A resource request 113 may specify a computing resource (e.g., server, processor cores, racks, etc.) and a flexible resource commitment for use of the computing resource. The flexible resource commitment may specify a resource commitment rate and a burst tier for use of the computing resource.

The resource commitment rate sets a minimum number of units of a computing resource that a cloud customer 110 intends to use at one time, for example, during a particular time period. If the cloud customer 110 commits to a minimum number of units, the resource provider 120 may provide the resource user 110 access to up to the minimum number of units of the computing resource at a discounted lease rate. For example, a resource user 110 may commit to using ten servers all day (or a portion of the day) for a period of one month. In response, the resource provider 120 may allocate ten servers to the resource user 110 for use during that month at a discounted lease rate that is less than a standard rate for the ten servers. This discounted lease rate may be a flat rate for the ten servers for the one month period.

The burst tier specifies an additional number of units that the resource user 110 may make use of in addition to the minimum number specified by the resource commitment rate. The resource provider 120 may provide the resource user 110 access to the additional units at a discounted rate. Continuing the previous example, the resource user 110 may estimate that it will need an additional three servers during high demand periods. In this example, the resource user 110 may select a burst tier that allows the resource user 110 to use up to thirteen servers at a time at a (or more than one) discounted rate. For example, use of the first ten servers may be provided at a discounted lease rate and use of the additional three resources may be provided at a discounted burst rate. The lease rate and burst rate may be the same or different on a per unit basis. For example, the first ten servers may be provided at a rate of $100/day (i.e., $10 per server per day) and each of the additional three servers may be provided at a discounted burst rate of $10 per day (or $11 per day).

The resource provider 120 may provide multiple burst tiers for selection by resource users 110. Each burst tier available for selection may specify an additional number of units of a resource in terms of an actual number of additional units or in terms of a percentage increase in the number of units above the resource commitment rate. For example, the resource provider 120 may have burst tiers of 10%, 25%, and 50%, where each percentage is above a resource commitment rate. If a resource user 110 selects a resource commitment rate of ten servers and a burst tier of 50%, the resource user 110 would be able to use up to fifteen servers (10 servers+50%*10 additional servers) at a time, and the additional five servers may be provided at a discounted rate.

In some implementations, the resource user 110 may specify the burst tier in terms of a number of additional units of the computing resource or a percentage increase in the number of units above the resource commitment rate. For example, the resource provider 120 may allow resource users 110 to select a burst tier within a particular range of numbers of units or percentage increases.

In some implementations, the burst tier may also specify a maximum amount of time in which the additional units of the computing resource may be used during a particular time period. For example, the burst tier may specify that the resource user 110 may only receive the discounted price for the additional units specified by the burst tier for two hours each day. The resource user 110 may be charged a higher rate for use of additional units of the computing resource that exceeds the two hours in a particular day.

A discounted rate for the use of the additional units specified by the burst tier and/or a lease rate for the use of the units specified by the resource commitment rate may be determined based on the burst tier selected. A burst tier that specifies a large number of additional units of a computing resource may increase the number of units of the resource that the resource provider 120 should have available for use by the resource user 110. Therefore, a burst tier that calls for a large number of additional units may result in a higher discounted price per unit (e.g., less of a discount from the standard rate) than a burst tier that calls for fewer additional units (e.g., more of a discount from the standard rate). For example, the price for using the additional units may be directly proportional to the number of additional units specified by the burst tier. Similarly, the lease rate may vary proportionally with the number of additional units specified by the burst tier.

The discounted rate for the additional units specified by the burst tier may also be based on the amount of time during a particular time period in which the resource user 110 is allowed to use the additional units for the discounted price. For example, the discounted rate may be higher for greater amounts of time in which the resource user 110 can use the additional units during the time period for the discounted rate (e.g., the discounted rate may be directly proportional to the amount of time).

With the resource commitment rate and the burst tier set, the resource provider 120 may allocate the computing resource to the resource user 110. The resource provider 120 may provide access to a number of units of the computing resource that is requested by the resource user 110. For example, the resource user 110 may request a particular number of units that is less than, equal to, or more than a total usage allowance defined by (e.g., equal to) the sum of the number of units specified by the resource commitment rate and the number of additional units specified by the burst tier. The number of requested units may vary over time, for example, in response to variations in the number of units needed by the resource user 110. For example, the actual usage may be within the resource commitment rate for a first portion of time and may be within the burst tier or exceed the total usage allowance during other portions of time.

In some implementations, the resource provider 120 may allow or preclude the use of units in excess of the total usage allowance defined by the resource commitment rate and the burst tier. For example, the resource provider 120 may charge a higher rate for usage above a sum of the number of units specified by the resource commitment rate and the number of units specified by the burst tier. Or, the resource provider 120 may not allow the resource user 110 access to more units than the sum.

The resource provider 120 includes a resource usage apparatus 121 (e.g., one or more computers). The resource usage apparatus 121 includes a usage monitor 122 that monitors the resource usage of the resource users 110. The usage monitor 122 may monitor the number of units of a particular computing resource used by the resource users 110 per unit time. For example, the usage monitor 122 may monitor the number of units of the particular computing resource that is being used, each minute, each second, every five minutes, or at another appropriate interval.

The usage monitor 122 can store data regarding the usage in a resource usage data store 126. The resource data storage unit 126 can store data regarding resource usage for multiple resource users 110. For each resource user 110, the resource usage data may include usage data for each particular computing resource of the computing provider 120 that was used by the resource user 110.

The resource provider 110 also includes an invoice generator 124 that generates invoices 115 for resource users based on resource usage and flexible resource commitments for the resource users 110. For each resource user 110 and each computing resource used by the resource user, the invoice generator 124 can determine a cost associated with the use of the computing resource based on the flexible resource commitment for the computing resource. Example techniques for determining the cost for resource usage is described below with reference to FIGS. 2-4. The invoice generator 124 can generate an invoice for a resource user 110 using the determined cost for each computing resource used by the resource user 110 and provide the invoice to the resource user 110 over the cloud network of the computing service 102 or another network.

In some implementations, the resource provider 120 may allow for unused units to roll over to the next period. For example, if the resource user used an average of four units per unit time over the course of a particular time period and the resource commitment rate is five units, the resource provider 120 may allow the resource user to use an additional unit over the course of the next time period.

Figure 2:
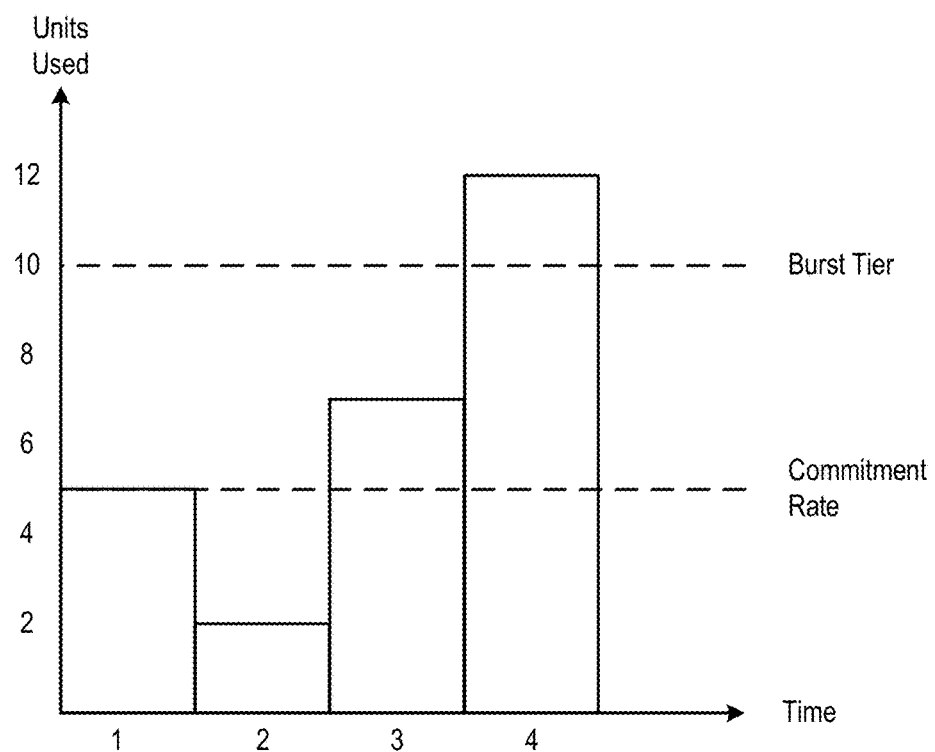
FIG. 2 depicts an example chart showing the number units of a computing resource used over time and a corresponding commitment rate and burst tier for use of the computing resource.

FIG. 2 depicts an example chart 200 showing the number units of a computing resource used over time and a corresponding commitment rate and burst tier for use of the computing resource. In this example, a flexible resource commitment specifies a resource commitment rate of five units and a burst tier of five additional units for a particular computing resource. In addition, the discounted lease rate for using a number of units of the particular computing resource is $10 per time period in which the resource user's usage is within the resource commitment rate. The discounted burst rate for additional units in excess of the resource commitment rate and the maximum specified by the burst tier (i.e., ten total units) is, in this example, $3 per unit.

In a first time period (time period 1), a resource user used five units of a particular computing resource (e.g., server, rack, etc.). As this number of units is within the resource commitment rate of five units, the resource user may receive a discounted lease rate for the time period 1. In this example, the resource user would be charged $10 for time period 1.

In the second time period (time period 2), the resource user used two units of the particular computing resource. In some implementations, the resource user is charged the discounted lease rate for time periods in which the actual usage is less than the resource commitment rate. In this example, the resource user would be charged $10 for time period 2.

In the third time period (time period 3), the resource user used seven units of the particular computing resource. As the seven units are greater than the resource commitment rate but within the burst tier, the resource user may receive discounted burst rate for the additional two units that are in addition to the five units of the resource commitment rate. In this example, the cost for using the computing resource would be $10 for the first five units and $3 for each additional unit in excess of the five units, i.e., $6 for the two additional units. Thus, the total cost for time period 3 is $10+$6=$16.

In the fourth time period (time period 4), the resource user used twelve units of the particular computing resource. For the first five units, the cost for the first five units would be $10, like above. For the next five units (i.e., units 6-10) that are within the burst tier, the cost would be $3*5=$15. In this example, the resource user used two units in excess of the total allowance specified by the resource commitment rate and the burst tier. The cost for these two units may be based on a standard or higher rate than the discounted rate. For example, the cost may be $10 per unit, for a total of $20 for the two excess units. Thus, the total cost for time period 4 would be $10+$15+$20=$45. Without receiving a discounted burst rate for the burst tier, the cost may have been $10 for the first five units plus $70 for the units in excess of the first five units (e.g., 7 units*$10), for a total cost of $80 for time period 4.

In the example of FIG. 2, the cost for each time period is determined individually. In some implementations, the cost may be determined based on an aggregate usage, such as a total usage or an average usage, over a particular time period. For example, the resource provider may determine an average, actual usage rate for the time period and compare that to the resource commitment rate and the burst tier. If the average rate is less than or equal to the resource commitment rate, the cost may be based on the lease rate. If the average rate exceeds the resource usage rate, the cost may be based on the actual usage, for example, using a discounted burst rate for usage within the burst tier and a higher rate for usage in excess of the burst tier. Using the flexible resource commitment of FIG. 2, resource usage in the burst tier may cost $3 per unit resource per unit time and resource usage that exceeds the burst tier may cost $10 per resource unit per unit time.

In some implementations, the discounted burst rate may be the same on a per unit basis as the discounted lease rate, For example, at $10 per time period for the use of five units, the per unit discounted lease rate would be $2 per unit per time period. In this example, the discounted burst rate may also be $2 per unit in excess of the five units.

Figure 3:
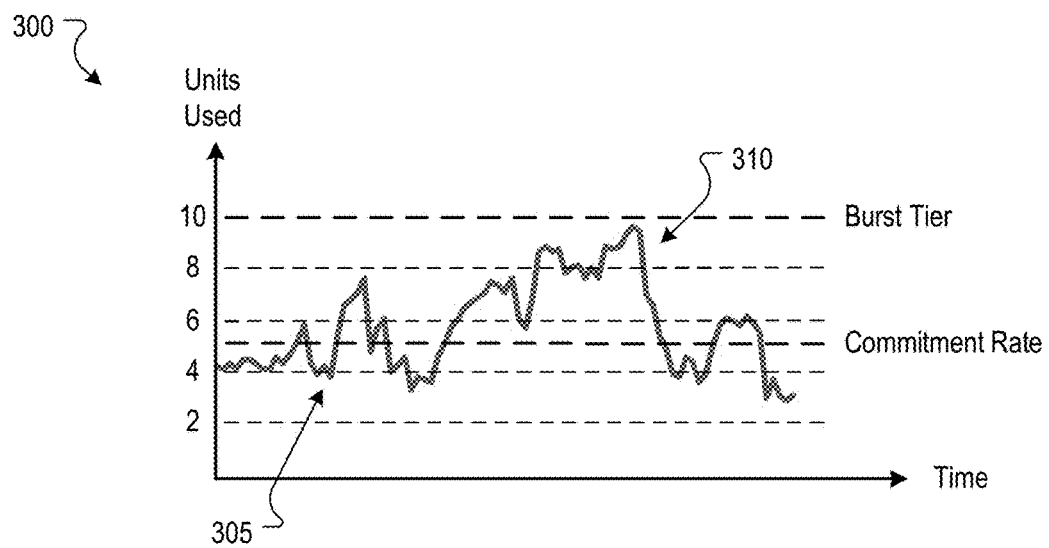
FIG. 3 depicts another example chart showing the number units of a computing resource used over time and a corresponding commitment rate and burst tier for use of the computing resource.

FIG. 3 depicts another example chart 300 showing the number units of a computing resource used over time and a corresponding commitment rate and burst tier for use of the computing resource. In this example, the resource commitment rate and the burst tier rate are the same as for FIG. 2. As shown in FIG. 3, the actual usage varies throughout the illustrated time period. At some points, such as point 305, the actual usage is within the resource commitment rate. At other points, such as point 310, the actual usage exceeds the resource commitment rate, but is within the burst tier.

Figure 4:
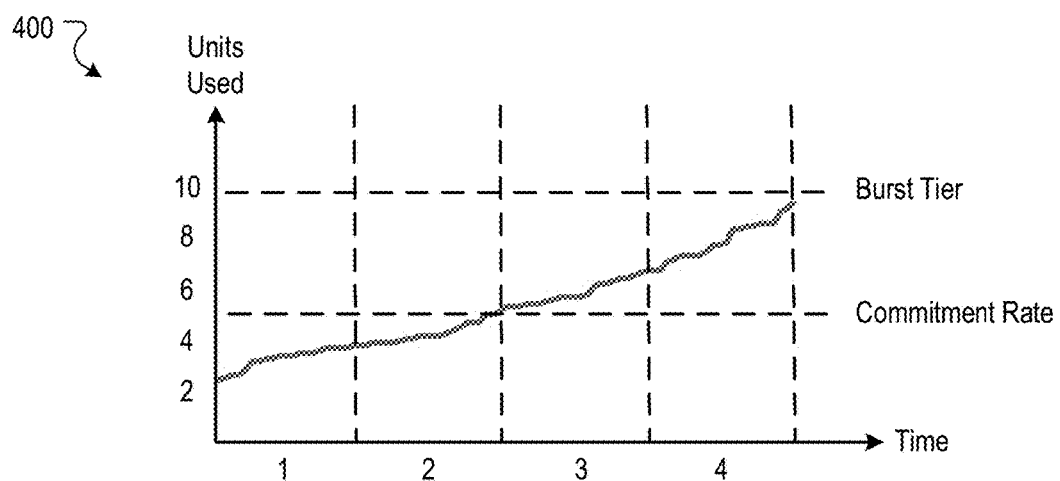
FIG. 4 depicts an example chart showing a cumulative distribution of the number of units used in the chart of FIG. 3.

FIG. 4 depicts an example chart 400 showing a cumulative distribution of the number of units used in the chart of FIG. 3. The cumulative distribution function can be used to determine a cost for using a particular computing resource over the course of a particular time period. The total cost for the particular time period may be based on several costs associated with the actual usage. A first cost may be based on a lease rate specified by the flexible resource commitment. The lease rate may cover the costs associated with using units within the resource commitment rate throughout the time period. For example, the lease rate may be $40 for the duration of the time period.

A second, burst tier cost may be based on the amount of time in which the actual usage exceeds the resource commitment rate, but is within the burst tier. The burst tier cost may also be based on a discounted burst rate for usage within the burst tier and a number of units actually used within the burst tier. For example, the discounted burst rate may specify a cost per additional unit of the computing resource per unit time. The burst tier cost may then be a product of the amount of time for which the actual usage was within the burst tier, the discounted burst rate, and the average usage within the burst tier.

If the actual usage includes resource usage that exceeds the burst tier, a third, excess cost can be determined for the excess usage. This excess cost may be based on a standard rate (e.g., that is higher than the discounted burst rate), a number units used in excess of the burst tier, and the amount of time that excess units were used. For example, the standard rate may specify a cost per excess unit of the computing resource per unit time. The excess cost may then be a product of the amount of time for which the actual usage exceeded the burst tier, the standard rate, and the average usage in excess of the burst tier.

In the example of FIGS. 3 and 4, the resource user would not incur any additional costs for time period 1 or time period 2 as the usage is within the resource commitment rate. For time periods 3 and 4, the total cost would include a burst tier cost for additional units used within the burst tier. For example, the burst tier cost for time period 3 may be based on (e.g., equal to) a product of the discounted burst rate, the length of time period 3, and the average number of units used within time period 3. Similarly, the burst tier cost for time period 4 may be based on (e.g., equal to) a product of the discounted rate, the length of time period 4, and the average number of units used within time period 4. The total cost for the time periods 1-4 may then be the sum of the lease rate, the burst tier cost for time period 3, and the burst tier cost for time period 4.

As described above, a flexible resource commitment can specify a maximum amount of time during a particular time period in which a resource user may make use of the burst tier. To illustrate, consider that time periods 1-4 are equal time periods over the duration of a day. A flexible resource commitment may specify a maximum resource usage of ¼ of each day (or 6 hours). In this example, the resource user's actual usage was within the burst tier for ½ the day. Thus, the resource user exceeded the maximum burst tier time by ¼ of the day. The resource user may receive the benefit of the discounted burst rate for time period 3, which represents ¼ of the day spent in the burst tier, but may not receive the benefit of the discounted burst rate for time period 4. Instead, the cost for the additional resources (the units in excess of the commitment usage rate of five units) used during time period 4 may be based on the standard rate, e.g., a product of the standard rate, the length of time for time period 4, and the average usage within the burst tier that is in excess of the resource commitment rate. In this example, the average usage in time period 4 is about eight units. Thus, the average usage in excess of the resource commitment rate is about three units (8 total units−5 committed units).

In some implementations, the resource provider may monitor the amount of time in which the actual usage is in the burst tier and determine when the maximum burst tier time has expired. In this example, the cost for the use of additional resources used before the burst tier time expired may be based on the discounted burst rate, the average burst tier usage before the burst tier time expired, and the length of the burst tier time. The cost for the use of additional resources used after the burst tier time expired for the remainder of the time period (e.g., rest of the day in this example) may be based on the standard rate, the average burst tier usage after the burst tier time expired, and the amount of time in which the usage was within the burst tier after the burst tier time expired.

The examples of FIGS. 3 and 4 illustrate resource usage for a particular time period, such as a day. For implementations that include a maximum burst tier time, the time can reset for the beginning of each new time period. For example, the example burst tier time of ¼ of a day discussed above may be available each day.

Figure 5:
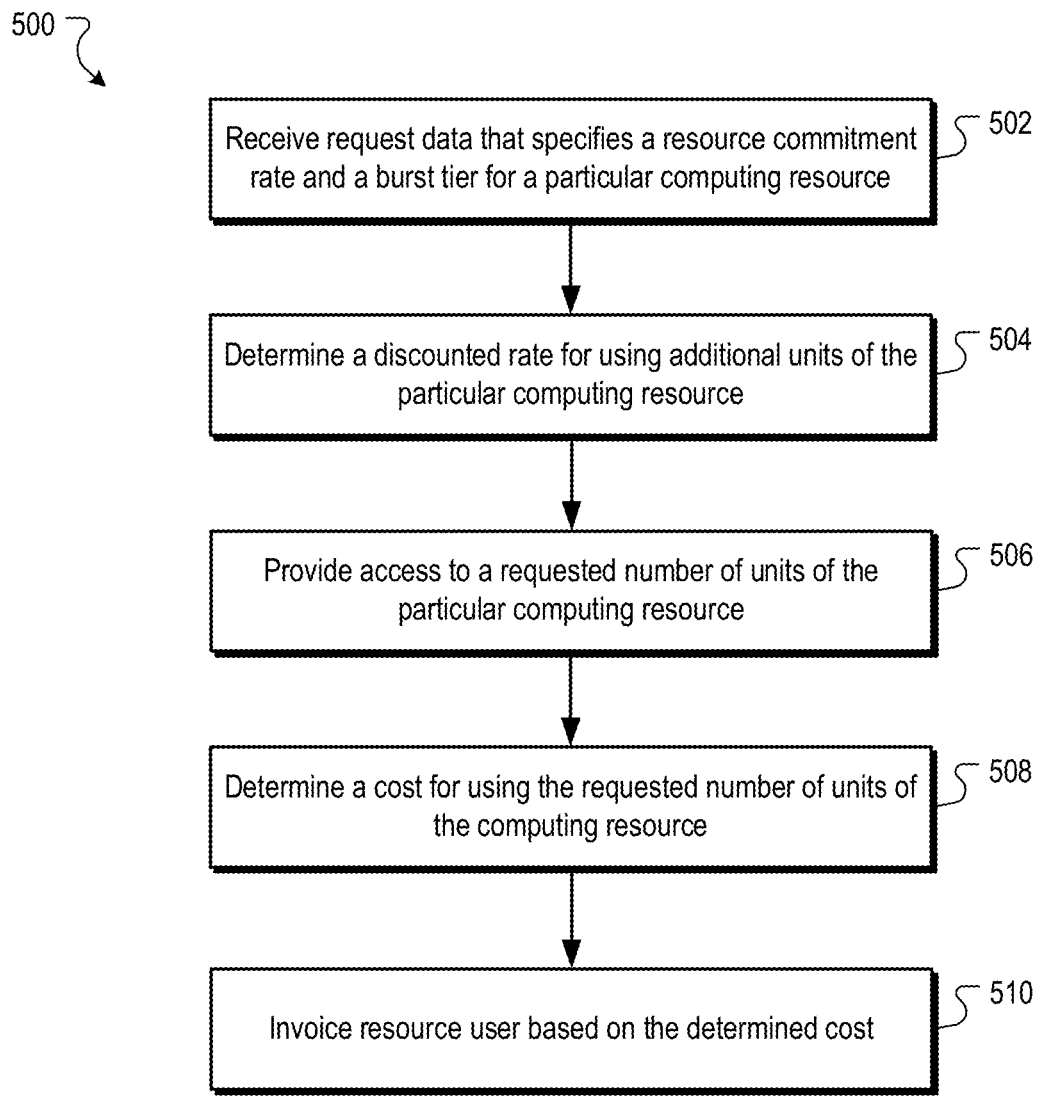
FIG. 5 is a flow chart of an example process for determining a cost for using computing resources and invoicing a resource user based on the determined cost.

FIG. 5 is a flow chart of an example process 500 for determining a cost for using computing resources and invoicing a resource user based on the determined cost. Operations of the process 500 can be implemented, for example, by a data processing apparatus, such as the resource usage apparatus 121 of FIG. 1. The process 500 can also be implemented by instructions stored on computer storage medium, where execution of the instructions by a data processing apparatus cause the data processing apparatus to perform the operations of the process 500.

In block 502, request data is received. The request data may be included in a resource request received by a resource provider and from a resource user. The request data may specify a particular computing resource that the resource user would like to use. The request data may also specify a resource commitment rate for the computing resource and a burst tier for the computing resource. As described above, the resource commitment rate may specify a first number of units of the computing resource that the resource user is committing to using during a particular time period. For example, the resource commitment rate may specify a minimum number of units of the computing resource for which the resource user is committing to lease during the time period.

The burst tier can specify an additional number of units of the particular computing resource that the resource user can use simultaneously with the first number of units of the computing resource. For example, the burst tier may specify a percentage increase over the first number of units, e.g., 10% or 25% more. The burst tier may also specify an amount of time (e.g., a maximum amount of time) in which the resource user may make use of the additional units specified by the burst tier.

In some implementations, the resource user may request a particular number of units of the computing resource. The resource user may then select from available burst tiers provided by the resource provider. The resource provider may provide, as available burst tiers, a set of percentage increases over a resource commitment rate from which the resource user may select. For example, the resource provider may provide three burst tiers, one at 10%, one at 25%, and one at 50%.

In block 504, a discounted rate for using the additional units of the computing resource is determined. For example, the resource usage apparatus 121 may determine the discounted burst rate based on the burst tier selected. The discounted rate may be directly proportional to the number of additional units or the percentage increase specified by the burst tier. The burst tier may also be based on the resource commitment rate and, if the burst tier specifies one, the amount of time in which the cloud user can use the additional units of the burst tier. For example, the discounted burst rate may be proportional to the amount of burst tier time.

In block 506, access to requested computing resources is provided to the resource user. For example, the resource user may request a particular number of units of the computing resource based on the need of the resource user. The resource provider may provide access to the requested computing resource unless the requested number of units exceeds a limit specified by the resource provider. The requested number of units may vary over time, for example, based on the need of the resource user.

In block 508, a cost is determined for the actual usage of the computing resource by the resource user. The cost may be based on the amount of usage within the resource commitment rate, the amount of usage within the burst tier, and/or any usage in excess of the burst tier. For example, the cost may be determined using one or more of the techniques described above with reference to FIGS. 3 and 4.

In block 510, an invoice is generated and sent to the resource user based on the determined price. For example, the resource usage apparatus 121 may generate and send the invoice to the resource user. In response, the resource user may pay the invoice.

Although the examples above are described in terms of a burst tier for a flexible resource commitment, a flexible resource commitment may specify multiple burst tiers. Each of the multiple burst tiers may have an associated discounted burst rate. As an example, consider a resource commitment rate of ten servers. The resource user may have common peak usages of fifteen servers and some less common peak usages of twenty servers. The resource user may select a first burst tier that allows it to access fifteen servers for a particular amount of time each time period and a second burst tier that allows it to access twenty servers for an amount of time that is less than the particular amount of time. The discounted burst rate for the first burst tier may be different than (e.g., higher than), the discounted burst rate for the second burst tier.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, by the data processing apparatus and from a resource user, request data that specifies:
      a resource commitment rate for a particular computing resource, the resource commitment rate specifying a first number of units of the particular computing resource that the resource user has committed to leasing for a particular time period; and
      a burst tier related to the resource commitment rate, the burst tier specifying an additional number of units of the particular computing resource that the resource user can use simultaneously with the first number of units of the particular computing resource at a discounted rate during the particular time period;
   determining, by the data processing apparatus, the discounted rate for using the additional units based on the first number of units and the additional number of units;
   providing, to the resource user and during the particular time period, access to use of a requested number of units of the particular computing resource over a cloud computing network, the requested number of units varying over time and exceeding the first number of units at least once during the particular time period; and
   determining, by the data processing apparatus and based on actual usage data received by the data processing apparatus from a usage monitor that monitors actual usage of computing resources, a cost for using the requested number of units of the particular computing resource based on the discounted rate and a lease rate for leasing the first number of units.

2. The method of claim 1, wherein receiving the request data comprises receiving a selection of the burst tier from a plurality of burst tiers, each burst tier specifying a percentage increase above the resource commitment rate.

3. The method of claim 1, wherein the discounted rate is directly proportional to the additional number of units.

4. The method of claim 1, wherein the burst tier further specifies a maximum amount of time during the particular time period that the resource user can use the additional number of units of the particular computing resource during the particular time period for the discounted rate.

5. The method of claim 4, wherein the discounted rate is further based on the maximum amount of time.

6. The method of claim 1, wherein:
   the lease rate specifies a first cost per unit of the particular computing resource used per unit of time;
   the discounted rate specifies a second cost per unit of the particular computing resource used per unit of time.

7. The method of claim 6, wherein determining the cost comprises:
   determining a first cost based on the first cost per unit rate and a first amount of time during the particular time period in which the resource user used no more than the first number of units of the particular computing resource;
   determining a second cost based on the second cost per unit rate a second amount of time during the particular time period in which the resource user used more than the first number of units of the particular computing resource but less than a sum of the first number of units and the additional number of units of the particular computing resource; and
   determining the cost based on a sum of the first cost and the second cost.

8. The method of claim 7, wherein determining the cost comprises:
   determining that the resource user used, during one or more periods of time, a total number of units of the computing resource that exceeds a sum of the first number of units and the additional number of units; and
   determining, for each of the one or more periods of time, a third cost based on an increased rate and the total number of units used during the period of time, the third rate being greater than the lease rate and the discounted rate,
   wherein the cost is further based on a sum of the third costs.

9. The method of claim 6, wherein the burst tier further specifies a maximum amount of time during the particular time period that the resource user can use the additional number of units of the particular computing resource during the particular time period for the discounted rate; the method further comprising:
   determining that the second amount of time exceeded the maximum amount of time;
   identifying an excess time period after the maximum amount of time expired; and
   determining a third cost based on a length of the excess time period, a number of excess units of the particular computing resource used during the excess time period, and an increased cost for the number of excess units of the computing resource, the excess units being a number of units of the particular computing resource used in excess of the first number of units.

10. A system comprising:
   a data processing apparatus; and
   a memory apparatus in data communication with the data processing apparatus and storing instructions executable by the data processing apparatus and that upon such execution cause the data processing apparatus to perform operations comprising:
      receiving, from a resource user, request data that specifies:

a resource commitment rate for a particular computing resource, the resource commitment rate specifying a first number of units of the particular computing resource that the resource user has committed to leasing for a particular time period; and a burst tier related to the resource commitment rate, the burst tier specifying an additional number of units of the particular computing resource that the resource user can use simultaneously with the first number of units of the particular computing resource at a discounted rate during the particular time period;

determining the discounted rate for using the additional units based on the first number of units and the additional number of units;

providing, to the resource user and during the particular time period, access to use of a requested number of units of the particular computing resource, the requested number of units varying over time and exceeding the first number of units at least once during the particular time period; and determining a cost for using the requested number of units based on the discounted rate and a lease rate for leasing the first number of units.

11. The system of claim 10, wherein receiving the request data comprises receiving a selection of the burst tier from a plurality of burst tiers, each burst tier specifying a percentage increase above the resource commitment rate.

12. The system of claim 10, wherein the discounted rate is directly proportional to the additional number of units.

13. The system of claim 10, wherein the burst tier further specifies a maximum amount of time during the particular time period that the resource user can use the additional number of units of the particular computing resource during the particular time period for the discounted rate.

14. The system of claim 13, wherein the discounted rate is further based on the maximum amount of time.

15. The system of claim 10, wherein:
the lease rate specifies a first cost per unit of the particular computing resource used per unit of time;
the discounted rate specifies a second cost per unit of the particular computing resource used per unit of time.

16. The system of claim 15, wherein determining the cost comprises:
determining a first cost based on the first cost per unit rate and a first amount of time during the particular time period in which the resource user used no more than the first number of units of the particular computing resource;
determining a second cost based on the second cost per unit rate a second amount of time during the particular time period in which the resource user used more than the first number of units of the particular computing resource but less than a sum of the first number of units and the additional number of units of the particular computing resource; and
determining the cost based on a sum of the first cost and the second cost.

17. The system of claim 16, wherein determining the cost comprises:
determining that the resource user used, during one or more periods of time, a total number of units of the computing resource that exceeds a sum of the first number of units and the additional number of units; and
determining, for each of the one or more periods of time, a third cost based on an increased rate and the total number of units used during the period of time, the third rate being greater than the lease rate and the discounted rate,
wherein the cost is further based on a sum of the third costs.

18. The system of claim 15, wherein the burst tier further specifies a maximum amount of time during the particular time period that the resource user can use the additional number of units of the particular computing resource during the particular time period for the discounted rate; the method further comprising:
determining that the second amount of time exceeded the maximum amount of time;
identifying an excess time period after the maximum amount of time expired; and
determining a third cost based on a length of the excess time period, a number of excess units of the particular computing resource used during the excess time period, and an increased cost for the number of excess units of the computing resource, the excess units being a number of units of the particular computing resource used in excess of the first number of units.

19. A computer storage medium encoded with a computer program,
the program comprising instructions that when executed by data processing apparatus cause the data processing apparatus to perform operations comprising:
receiving, from a resource user, request data that specifies:
a resource commitment rate for a particular computing resource, the resource commitment rate specifying a first number of units of the particular computing resource that the resource user has committed to leasing for a particular time period; and
a burst tier related to the resource commitment rate, the burst tier specifying an additional number of units of the particular computing resource that the resource user can use simultaneously with the first number of units of the particular computing resource at a discounted rate during the particular time period;
determining the discounted rate for using the additional units based on the first number of units and the additional number of units;
providing, to the resource user and during the particular time period, access to use of a requested number of units of the particular computing resource, the requested number of units varying over time and exceeding the first number of units at least once during the particular time period; and
determining a cost for using the requested number of units based on the discounted rate and a lease rate for leasing the first number of units.

20. The computer storage medium of claim 19, wherein receiving the request data comprises receiving a selection of the burst tier from a plurality of burst tiers, each burst tier specifying a percentage increase above the resource commitment rate.

* * * * *